Patented Mar. 26, 1946

2,397,423

UNITED STATES PATENT OFFICE 2,397,423

PARASITICIDAL PREPARATIONS

Elbert C. Ladd, Passaic, N. J., assignor to United States Rubber Company, New York, N. Y., a corporation of New Jersey No Drawing. Application March 17, 1943,
Serial No. 479,487

15 Claims. (Cl. 167—33)

This invention relates to new and useful improvements in parasiticidal preparations.

More particularly the invention relates to parasiticides, which may be used as germicides, that is, fungicides, bactericides, and algaecides, as seed protectants, and as insecticides, the latter term being considered to include larvicides and arachnicides, as well as insectifuges and larvaefuges.

I have found that di(tertiary amino) thiaxanthenes, and their derivatives, such as the di(tertiary amino) thiaxanthydrols, di(tertiary amino) thiaxanthones, and di(tertiary amino) thiaxanthene salts, are effective germicides and insecticides. The following general formulas are illustrative:

Examples of di(tertiary amino) thiaxanthenes

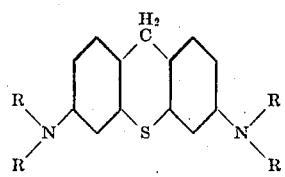

in which each R is an acylic or alicylic aliphatic or olefinic hydrocarbon radical having from one to eighteen carbon atoms. Examples of such chain- and cyclo-paraffinic and olefinic hydrocarbon radicals are methyl, ethyl, propyl, butyl, allyl, isobutyl, amyl, isoamyl, tert-amyl, hexyl, cyclopentyl, cyclopentenyl, cyclohexyl, cyclohexenyl, octyl, dodecyl, hexadecyl, octadecyl. R is the same in the formulas for the various di(tertiary amino) thiaxanthene derivatives below.

Examples of di(tertiary amino) thiaxanthene salts

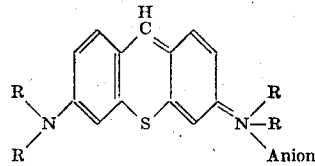

and also double salts of this salt with inorganic salts, for example, zinc chloride.

Examples of di(tertiary amino) thiaxanthydrols

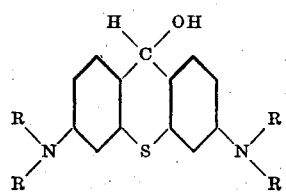

Examples of di(tertiary amino) thiaxanthones

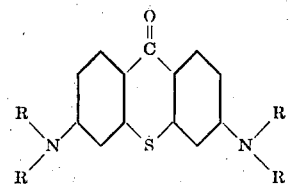

These compounds are known as thiopyronine compounds and have been used as dyes, the di(tertiary amino) thiaxanthenes being the "leuco bases," the di(tertiary amino) thiaxanthydrols being the "color bases," and the salts being the dyestuffs. The di(tertiary amino) thiaxanthydrols may be readily reduced to the di(tertiary amino) thiaxanthenes, and oxidized to the di(tertiary amino) thiaxanthones. Upon standing or warming with alkali the di(tertiary amino) thiaxanthydrols become converted into the di(tertiary amino) thiaxanthenes and di(tertiary amino) thiaxanthones. German Patent No. 65,739 describes the reaction of sulphur in fuming sulphuric acid upon bis(p-dialkylaminophenyl)-methanes to produce thiopyronine compounds.

The thiopyronine compounds may be used to immunize seeds and to protect plants or soil from organisms harmful to seeds and plants. They may also be applied to prevent or retard fungus growth and the formation of, for example, mildew, or rope, wood, fur, hair, feathers, cotton, wool, leather and the like. They may be applied as dust or sprays or in solution in a suitable solvent. They may be applied undiluted or diluted, or mixed with carriers, or other germicides or insecticides, fertilizers, hormones, buffering or safening agents.

The preparation of these chemicals and tests showing their effectiveness as germicides and insecticides are illustrated in the following examples:

*Example I*

120 grams of sulphur were added slowly with stirring to 1200 grams of fuming sulphuric acid (25% SO₃) at 20–25° C., and stirred until the sulphur dissolved. Then 120 grams of p,p'-tetramethyl-diamino-diphenylmethane were slowly stirred in at 30–35° C. After the addition was complete, the mixture was allowed to stand at room temperature for 2 or 3 hours, then poured into ice water. The precipitate (sulphur) was filtered off and sufficient zinc chloride was added to the filtrate to precipitate the zinc chloride double salt of the thiopyronine salt (3,6-bis(dialkylamino)-thiaxanthene sulphate) when the solution was heated to boiling. The mixture was then cooled and filtered and the precipitate air-dried. It was a dark purple powder which took on a greenish lustre on drying. The product was shown to be a powerful fungicide by the following test: 100 pea seeds, variety Perfection, were given an instantaneous dip in a 0.25% solution of the double salt in water and another 100 seeds were given an instantaneous dip in a .125% solution of the same. These seeds together with 100 untreated seeds were planted in greenhouse soil containing a number of pathogenic organisms. The soil was kept moist in order to render the test more severe. After 10 days' germination, counts were taken. The percent stand was 91% for the seeds treated with the .25% solution, 80% for the seeds treated with the .125% solution, and 46% for the untreated seeds.

Example II 30 grams of the zinc chloride double salt of the thiopyronine salt, described in Example I, were dissolved in water and the solution made alkaline by addition of aqueous sodium hydroxide. A violet-colored solid precipitated. It was filtered off, washed with water and air-dried. According to the Chemisches Central-Blatt, 1902 II, page 371, the product is the color base 3,6-bis(dimethylamino)-thiaxanthydrol. One hundred pea seeds, variety Perfection, were dusted with .25% of their weight of the chemical and planted in greenhouse soil as in Example I. At the same time, 100 untreated seeds were planted. After 10 days, the per cent stand of pea seedings from treated seed was observed to be 89%, whereas that from untreated seed was 8%.

Example III

The product of Example II may also be made without isolating the intermediate zinc chloride double salt of the pyronine salt, thus: 120 grams of sulphur were stirred into 1200 grams of fuming sulphuric acid (25% SO₃) at 20–25° C., and after it had dissolved, 120 grams of p,p'-tetramethyl-diamino-diphenylmethane were stirred in at 30–35° C. After the addition was complete, the mixture was allowed to stand for 2 to 30 hours, and was then poured into ice water. The mixture was filtered to remove precipitated sulphur, and aqueous sodium hydroxide was added to the filtrate until the precipitation of the solids comprising essentially crude 3,6-bis(dimethylamino)-thiaxanthydrol was complete. The violet-colored solid was filtered off, washed with water and air-dried. One hundred pea seeds, variety Perfection, were dusted with ¼% of their weight of this product, planted in infested soil as described in Example I, and the per cent stand of seedings from the treated seed was compared with that of untreated seed. The per cent stand after 10 days for treated seed was 67% whereas that for untreated seed was 20%.

Example IV

A preparation of 3,6-bis(dimethylamino)-thiaxanthydrol was made precisely as described in Example III, except that the sulphur was not removed; that is, the filtration to remove the sulphur was omitted. The product, therefore, contained all the sulphur formed in the reaction mixture. The product was a violet-colored solid. Pea seed was dusted with ¾% of its weight of the chemical mixture and tested in the same manner as above described. The per cent stand of seedlings after 10 days for treated seed was 85%, whereas the per cent stand for untreated seed was 18%. In another test, seed dusted with ¼% of its weight of this product gave a stand of 59%, whereas untreated seed gave a stand of 2%.

Example V 30 gram of sulphur were stirred into 300 grams of fuming sulphuric acid at 20–25° C. After all had dissolved, 30 grams of p,p'-tetraethyl-diamino-diphenylmethane were added slowly with stirring at 30–35° C. After the addition was complete, the mixture was stirred for 2 hours, then poured into ice water and filtered. The filtrate was made alkaline with aqueous NaOH. The purple tar which formed was extracted with ether until it became a pulverizable solid, comprising essentially 3,6-bis(diethylamino)-thiaxanthydrol. One hundred pea seeds, variety Perfection, were dusted with ¾% of their weight of the chemical, and planted in infected greenhouse soil as in Example I. One hundred pea seeds untreated were planted at the same time under the same conditions. Per cent stand of seedlings from treated seed after 10 days was 85%, whereas the per cent stand from untreated seed was 3%.

Example VI

The arachnicidal properties of the thiopyronine compounds are shown by the following test: 1 part of the chemical of Example V was suspended in 200 parts of water containing ½ part of Nacconal (wetting agent). "Nacconal" is a proprietary material believed to be a sulfonated condensate of an aromatic hydrocarbon and a chlorinated long chain aliphatic hydrocarbon. The liquid was then sprayed on bean plants infested with red spider. Counts taken after 72 hours showed that 60% of the spiders had been killed. Counts taken on unsprayed plants infested with spiders showed less than 5% dead.

Example VII

The repellent properties of the thiopyronine compounds are shown by the following test: Four pieces of woolen cloth 1½" by 4" were immersed in a 5% solution by weight of the chemical of Example V in acetone until saturated with the solution, then removed, air dried, and each placed in a separate covered petri dish containing 5 black carpet beetle larvae and allowed to stand in a dark place at room temperature for three weeks. Four pieces of untreated wool cloth were placed in separate covered petri dishes each of which also contained 5 carpet beetle larvae and allowed to stand for the same period of time under the same conditions. At the end of this period it was found that no visible feeding had occurred on the treated samples whereas very heavy feeding had occurred on the untreated samples.

The chemicals of Example I and Example II were similarly shown to be repellents for the black carpet beetle larvae, being, however, slightly less effective as larvaefuges than the chemical of Example V.

Example VIII

The repellant properties of thiopyronine compounds are further shown by the following test: 1 part by weight of the chemical of Example II was suspended in 200 parts of water containing ⅕ part of Nacconal (wetting agent). The liquid was then sprayed on bean plants. After 24 hours the plants were exposed to 5 Mexican bean beetle larvae per plant which were allowed to feed for 7 days. Unsprayed plants of the same size were similarly exposed to an equal number of the Mexican bean beetle larvae for the same period of time. At the end of this time the leaves of unsprayed plants were completely skeletonized whereas only 20% of the leaf surface of the treated plants had been eaten, that is, the treatment gave 80% protection under the conditions of the test. No foliage injury by the chemical treatment was observed.

The chemical of Example I showed a like repellency in a series of similar tests and, in addition, an average mortality of 40% was obtained. Observation showed that those which died were the ones which had eaten sufficient of the sprayed foliage to produce a deep red discoloration of their bodies. There was no mortality in the larvae feeding on untreated foliage. This indicates that if sufficient of this material is ingested it acts as a stomach poison.

Having thus described my invention, what I claim and desire to protect by Letters Patent is:

1. The method of protecting organic material against attack by microorganisms which comprises treating said organic material with material selected from the group consisting of 3,6-di(tertiary amino) thiaxanthenes, 3,6-di(tertiary amino) thiaxanthene salts, 3,6-di(tertiary amino) thiaxanthydrols, and 3,6-di(tertiary amino) thiaxanthones.

2. The method of protecting organic material against attack by microorganisms which comprises treating said organic material with a 3,6-bis(dialkylamino)-thiaxanthydrol.

3. The method of protecting organic material against attack by microorganisms which comprises treating said organic material with 3,6-bis-(dimethylamino)-thiaxanthydrol.

4. The method of immunizing seed against attack by fungi which comprises treating said seed with material selected from the group consisting of 3,6-di(tertiary amino) thiaxanthenes, 3,6-di(tertiary amino) thiaxanthene salts, 3,6-di(tertiary amino) thiaxanthydrols, and 3,6-di(tertiary amino) thiaxanthones.

5. The method of immunizing seed against attack by fungi which comprises treating said seed with a 3,6-bis(dialkylamino)-thiaxanthydrol.

6. The method of immunizing seed against attack by fungi which comprises treating said seed with 3,6-bis(dimethylamino)-thiaxanthydrol.

7. The method of controlling mildew on organic material which comprises treating said organic material with material selected from the group consisting of 3,6-di(tertiary amino) thiaxanthenes, 3,6-di(tertiary amino) thiaxanthene salts, 3,6-di(tertiary amino) thiaxanthydrols, and 3,6-di(tertiary amino) thiaxanthones.

8. The method of controlling mildew on organic material which comprises treating said organic material with a 3,6-bis-(dialkylamino)-thiaxanthydrol.

9. The method of controlling mildew on organic material which comprises treating said organic material with 3,6-bis(dimethylamino)-thiaxanthydrol.

10. The method of controlling insects which comprises treating the insects with a material selected from the group consisting of 3,6-di(tertiary amino) thiaxanthenes, 3,6-di(tertiary amino) thiaxanthene salts, 3,6-di(tertiary amino) thiaxanthydrols, and 3,6-di(tertiary amino) thiaxanthones.

11. The method of controlling insects which comprises treating the insects with a 3,6-bis(dialkylamino)-thiaxanthydrol.

12. The method of controlling insects which comprises treating the insects with 3,6-bis(dimethylamino)-thiaxanthydrol.

13. The method of protecting seeds, plants and soil against attack by fungi, bacteria and insects which comprises treating said material with a material selected from the group consisting of 3,6-di(tertiary amino) thiaxanthenes, 3,6-di(tertiary amino) thiaxanthene salts, 3,6-di(tertiary amino) thiaxanthydrols, and 3,6-di(tertiary amino) thiaxanthones.

14. The method of protecting seeds, plants and soil against attack by fungi, bacteria and insects which comprises treating said material with a 3,6-bis(dialkylamino)-thiaxanthydrol.

15. The method of protecting seeds, plants and soil against attack by fungi, bacteria and insects which comprises treating said material with 3,6-bis(dimethylamino)-thiaxanthydrol.

ELBERT C. LADD.